June 19, 1962 R. F. EGNER 3,039,565
ORDER ASSEMBLING APPARATUS
Filed Dec. 27, 1956 4 Sheets-Sheet 1

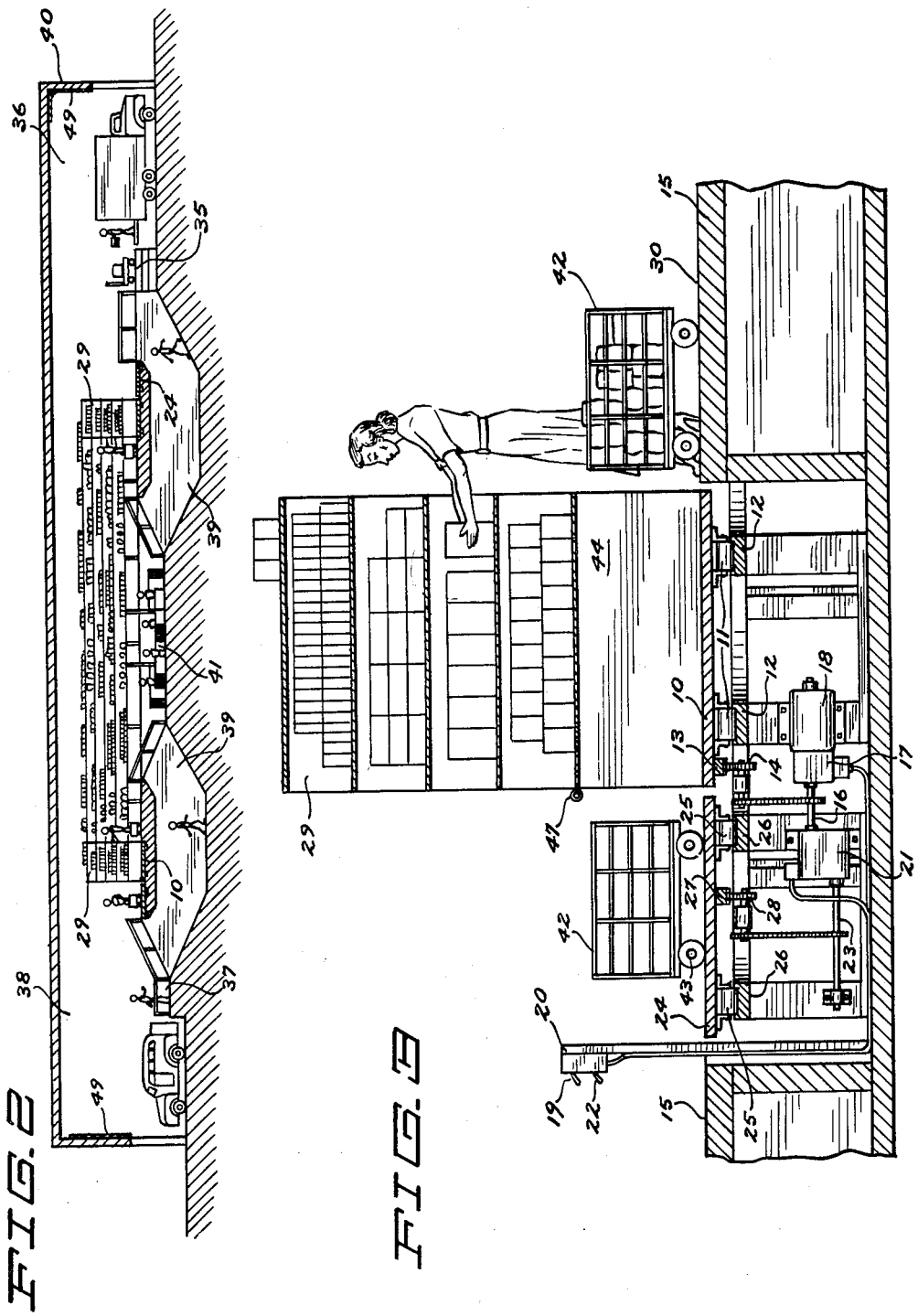

June 19, 1962 R. F. EGNER 3,039,565
ORDER ASSEMBLING APPARATUS
Filed Dec. 27, 1956 4 Sheets-Sheet 3

INVENTOR.
RUSSELL F. EGNER
BY
Braddock and Braddock
ATTORNEYS

June 19, 1962
R. F. EGNER
3,039,565
ORDER ASSEMBLING APPARATUS
Filed Dec. 27, 1956
4 Sheets-Sheet 4
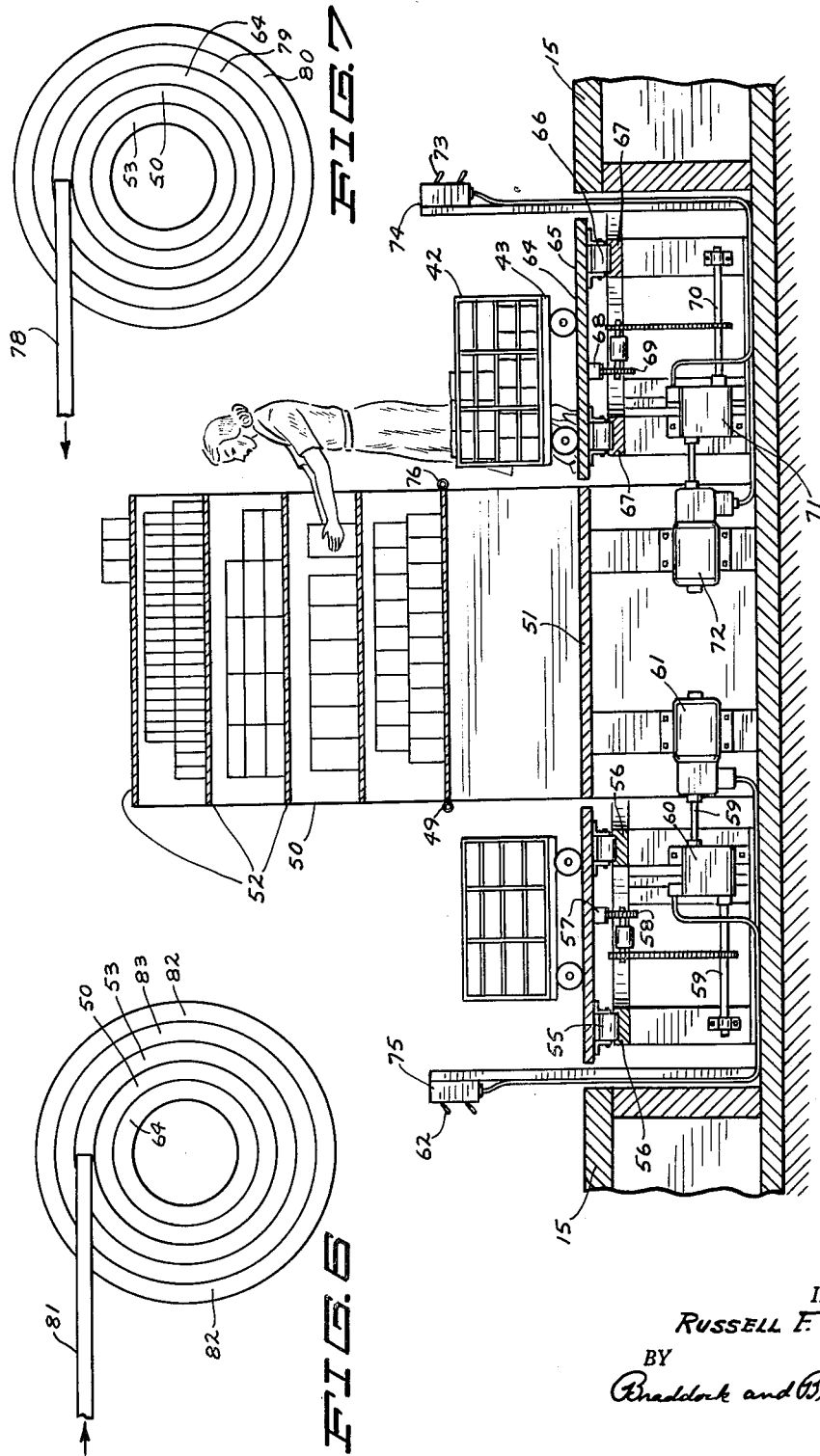
INVENTOR.
RUSSELL F. EGNER
BY
Braddock and Braddock
ATTORNEYS

United States Patent Office 3,039,565
Patented June 19, 1962

1

3,039,565
ORDER ASSEMBLING APPARATUS
Russell F. Egner, Minneapolis, Minn.
(621 Sheridan St. 21, Chillum, Md.)
Filed Dec. 27, 1956, Ser. No. 630,921
3 Claims. (Cl. 186—1)

This application is a continuation-in-part of my application for Order Assembling Apparatus, Serial No. 401,610 filed December 31, 1953, now abandoned.

This invention has relation to an order filling apparatus and will be particularly useful for filling telephoned or written orders for one or more of a plurality of a large number of products such as food products or hardware products or the like.

An apparatus made according to the present invention will include a large ring-shaped storage ring, a ring-shaped order assembling ring concentric with the storage ring at one side thereof and a ring-shaped stock distribution ring concentric with the storage ring at the other side thereof. One or more of these rings will be rotatably mounted to provide for relative movement between the storage ring and each of the other two rings. The diversified products from which orders are to be filled are situated in a plurality of convenient bins or vertically disposed horizontal shelves supported on said storage ring. The relative movement of the bins or shelves with respect to the order assembling ring will cause each of the products in the shelves to be moved past the person on the order assembling ring who is assembling the order. The relative movement of the bins with respect to the stock distribution ring will allow a person standing on the stock distribution ring to pass by each of the shelves or bins on the storage ring.

The relative movement between the various rings can be accomplished in several ways. The storage ring can consist of a fixed platform upon which the bins or shelves are positioned. In this case, the order assembling ring and the stock distribution ring will include movable platforms which can support a person and which can support stock being removed from the storage ring or placed thereon.

The same relative movement can be obtained when the storage ring consists of a movable rotating platform having shelves and bins supported thereon. In this case, the order assembling ring can include a fixed platform. The stock distribution ring can include a fixed platform adjacent the movable platform of the storage ring; or it can include a rotating platform immediately adjacent the storage ring.

The remainder of the apparatus of the present invention can include a warehouse floor providing a number of storage areas situated adjacent and spaced from the three concentric rings. Products used to replenish the bins or shelves are carried by means of carts or by hand or by conveyors from these warehouse floor storage areas to position adjacent the stock distribution ring. As these bins rotate with respect to the stock distribution ring, it may be desirable to have a cart on which the stock to be distributed is supported move along at the same angular speed as that of the storage ring with respect to the stock distribution ring. To accomplish this in the case of a movable storage ring, the stock distribution ring can be constituted as a movable ring and can be rotated at the same angular speed as the storage ring. When the product being loaded from the cart to the bins are such a size, quantity and nature that the transfer can be accomplished instantaneously, provision need not be made for rotating both the storage ring and the stock distribution ring at the same angular speed.

A passageway is provided from the area inside of the three concentric rings to the area outside thereof.

2

In the case where the storage ring is movable and the order assembling ring and stock distribution ring are permanently or temporarily fixed with respect to the warehouse floor; and in the case where the storage ring is fixed with respect to the warehouse floor and the order assembling ring and stock distribution ring are movable, carts or trucks containing either stock to be distributed and items making up an order being assembled which are supported on the stock distribution ring and the order assembling ring respectively can be temporarily fastened by means of a tongue or the like to projections on the storage ring structure. This will cause the cart or truck to roll over the surface of the fixed or movable platform of the order assembling ring or stock distribution ring at the same time maintaining its position adjacent a particular portion of the storage ring. In this way, the cart or truck can be fixed in position with respect to the storage ring for a long enough period to allow loading or unloading of particular products to or from said storage ring.

In the drawings,

FIG. 2 is a vertical sectional view taken on the line 2—2 in FIG. 1;

FIG. 3 is an enlarged, vertical sectional view taken on the line 3—3 in FIG. 1;

FIG. 5 is an enlarged, vertical sectional view taken on the line 5—5 in FIG. 4;

FIG. 6 is a diagrammatic plan view of an order assembling device disclosing a second modification of the invention; and FIG. 7 is a diagrammatic top plan view disclosing a third modification thereof.

Figure 1:
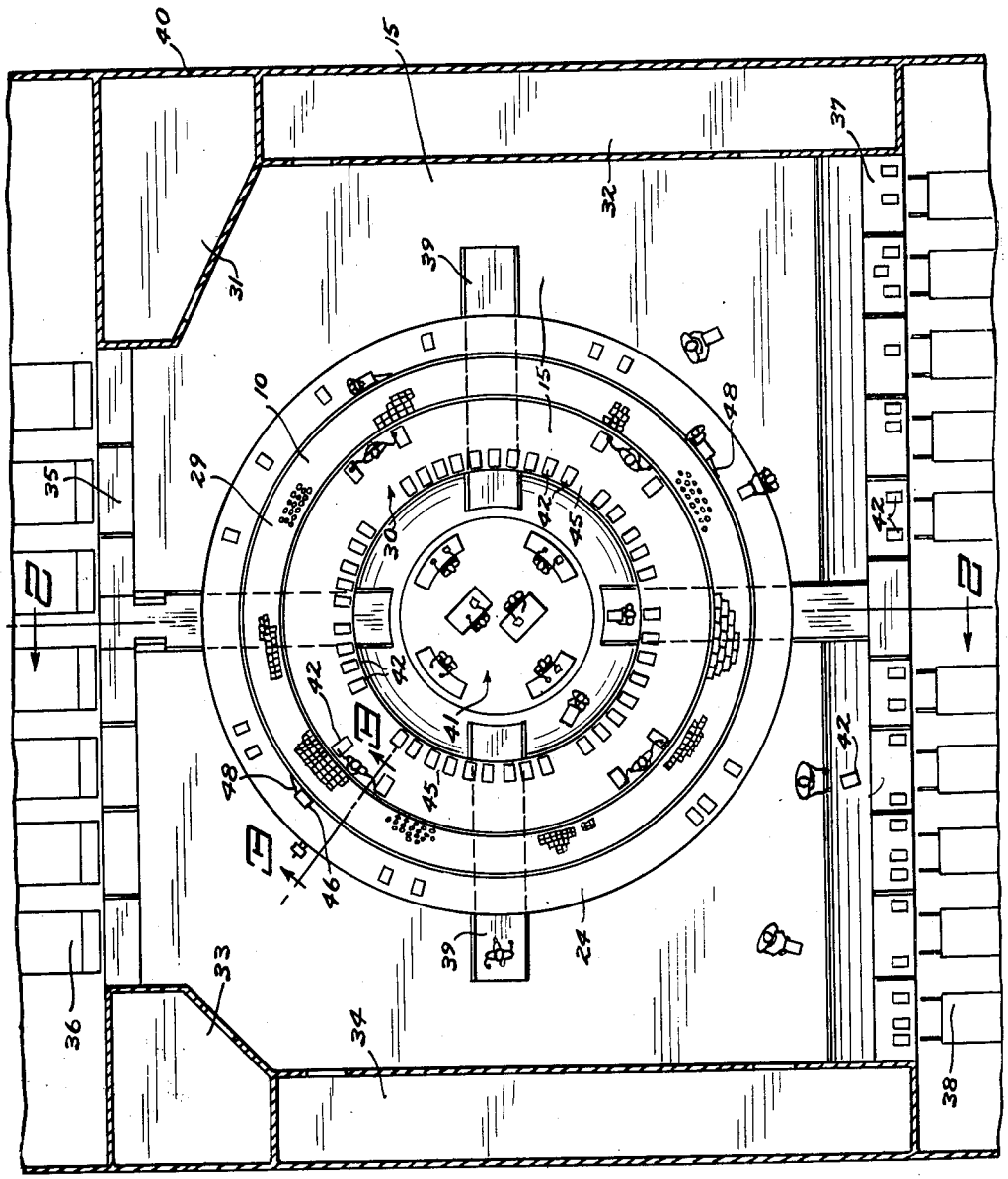
FIG. 1 is a top plan view of an order assembling apparatus of the present invention.

Referring to the first three figures of the drawings and the numerals of reference thereon, an order assembling warehouse includes a first ring-shaped rotating platform 10 having a plurality of rollers 11 rotatably mounted on an underside thereof and running in a pair of concentric circular tracks 12, 12 as seen in FIG. 3. A rack 13 is concentric with the platform 10 and the tracks 12, 12 and is fixedly attached to the underside of said platform. A gear 14 is rotatably mounted in a bearing which is fixedly positioned with respect to a main warehouse floor 15 of the apparatus. Gear 14 is driven through means including other gears by the shaft 16 from a gear box 17 which in turn is powered from a drive motor 18. Operation of control handle 19 on the control box 20 causes the shaft 16 to be selectively clutched to and unclutched from drive motor 18. Shaft 16 also extends into a gear box 21 and a control handle 22 on the control box 20 causes a shaft 23 extending outwardly from said gear box 21 to be selectively clutched to and unclutched from the shaft 16.

A second rotating platform 24 is immediately adjacent to and concentric with first rotating platform 10 and constitutes a stock distribution ring. This second platform 24 is supported on rollers 25 which are rotatably mounted on the underside thereof and which run in tracks 26, 26. A rack 27 is concentric with the second rotating platform 24 and is fixedly mounted on the underside thereof. A gear 28 is rotatably mounted on a bearing which is fixedly positioned with respect to the main floor 15. Said gear 28 is operably connected by means including other gears to be rotated concurrently with the rotation of the shaft 23.

A plurality of vertically disposed banks of horizontal shelves or bins 29 are positioned on the first horizontal rotating platform 10 to constitute with said platform a storage ring. A ring-shaped portion of the main floor 15 concentric with and immediately adjacent the first rotating platform 10 at a side thereof opposite second platform 24 is designated as working area or order filling ring 30. Upper surfaces of this order filling ring 30, the main warehouse floor 15, the first rotating platform 10 and the second rotating platform 24 are located in the same horizontal plane.

Open portions of the main warehouse floor 15 can be used as storage areas; or storage rooms can be provided which can be used for special storage purposes. For example, a room such as that designated at 31 can be refrigerated for the storage of meats, frozen foods, dairy products, etc. A room such as that indicated at 32 could be provided with refrigerated trays and could be used for the storage of fresh fruits and vegetables. A room such as that indicated at 33 could be for the storage of products such as flour and sugar which must be kept dry. A room such as that indicated at 34 could be for the storage of canned goods. Any of these storage areas could be used for the preparation of the products before placing them in the moving bins and on the moving shelves. That is to say, some of these storage areas could serve as preparation areas for butchering and packaging meats, or for cutting and wrapping vegetables, etc.

An unloading dock 35 extends along one side of the apparatus. As shown, this unloading dock is in the same plane as the main floor 15 and the storage areas located thereon. A garage area 36 is immediately adjacent this unloading dock. A loading dock 37 extends along another side of this apparatus. As shown, this unloading dock is at level below the main floor 15, but it could be situated at any convenient level. A garage area 38 is immediately adjacent this loading dock.

A plurality of access passageways 39 extend from inside of the order filling ring 30, down under this working area or order filling ring, and under the two rotating platforms to position outside of these platforms. A warehouse building 40 forms a cover over the entire apparatus.

Operation

Persons who perform the actual order assembling function receive a copy of the telephoned or written order from an order taking area 41 and will take up position on the order filling ring 30 adjacent the first rotating platform 10 with an order basket 42 on a four wheeled dolly or cart 45 at either side of them. As the products on the shelves move by the order assembler, the assembler will remove the products ordered in the quantity desired and place them in the order basket. When the order is completely filled and is entirely in the basket or baskets, the order assembler will push the four wheeled dolly 43 and its now loaded order basket 42 onto the first rotating platform 10 into an open compartment 44 comprised as the space beneath the bins 29 and above the surface of the first rotating platform. The order basket and dolly rotate with the platform until they reach an area adjacent the loading dock 37. Here a basket handling person will pull the order basket and dolly from the first rotating platform across the second rotating platform and onto the main warehouse floor 15 of the apparatus.

The loading dock 37 is divided into sections with each section representing a different geographical location within the community from which orders have been received. The filled order basket and dolly are wheeled by the handler to location in the section of the loading dock 37 corresponding to the part of the city or country to which the order is to be delivered. These baskets could also be placed on endless conveyors to be transported to the proper section of the dock. A delivery truck is backed into the loading garage area 38 to position adjacent the loading dock 37 and the filled order basket 42 will be lifted from the dolly 43 and placed inside of the truck. Dolly 43 can then be returned through one of the access passageways 39 to the order filling ring 30. Empty order baskets being returned by delivery men can likewise be carried through the access passageway 39 to the order filling ring. These now empty order baskets 42 and the dollies 43 can be stored along the inner periphery of the order filling ring as at 45 if so desired.

Products and supplies from the producer being delivered to the order assembling apparatus will arrive in trucks which can be backed into the unloading area 36 to be adjacent unloading dock 35. Unloading dock 35 can be divided into sections corresponding to the nature of the products being unloaded thereon. Products being unloaded from trucks or freight cars onto the unloading dock 35 will be wheeled on carts or carried on conveyors directly to their proper storage areas. Persons handling stocking and restocking of products on the first rotating platform will place products to be stocked in cars 46 which can be wheeled to positions adjacent said first platform. In the event that the second platform is in operation and is, therefore, moving at the same angular speed as the first platform, the carts need merely be wheeled onto the second platform and the person stocking the bins can stand on the platform and load the products from the carts to the bins as he and the cart move with the bins or shelves. In the event that the second rotating platform is stationary and serving as a part of the main floor 15, a plurality of hooks fixed to the bins such as that shown at 47 in FIG. 3 are used to fasten the carts 46 thereto. This is best seen as at 48 in FIG. 1. In this way the cart will be towed around the circle by the first rotating platform and the structure thereon. These hooks can also be used to support baskets (not shown) while the stock handler walks alongside of the moving shelves as he transfers products from the basket to the bin.

Copies of the orders received in the order taking area can be sent not only to the person assembling the order but also to the persons in the storage areas. In this manner, the stock handlers can be sure that they are replacing the products to the shelves at the same rate at which the order assemblers are removing them therefrom. This will also allow special orders of products such as meats to be prepared and placed on the rotating platform for removal by the order assemblers for inclusion with the remainder of the customers' orders.

It is obvious that slip rings consisting of concentric circles of conducting material could be fastened to the rotating platform to provide for electric power on the rotating platform so that some of the bins or shelf areas could be refrigerated for proper storage of temperature sensitive products.

While persons assembling orders and persons taking orders normally will gain access to the working area and the order taking area by access passageways 39, breaks in the shelves or bins can be provided so that access can be gained to these areas across the rotating platforms.

While the order assembling apparatus is particularly useful for assembling orders for grocery products, it is to be understood that it would be equally useful for assembling orders for hardware items or for many other types of products.

While the stock distribution ring is disclosed as being constituted as a movable or rotating platform 24, it is to be understood that it could be a fixed platform and that it is a fixed platform when the control handle 22 is operated to disengage the motor 21 from the rack 27.

While in this form of the invention, the order assembling ring is disclosed as being inside of the storage ring and the stock distribution ring is disclosed as being outside thereof, the apparatus of the invention would function in exactly the same manner if the order assembling ring was positioned outside of and the stock distribution ring was positioned inside of the storage ring.

Figure 4:
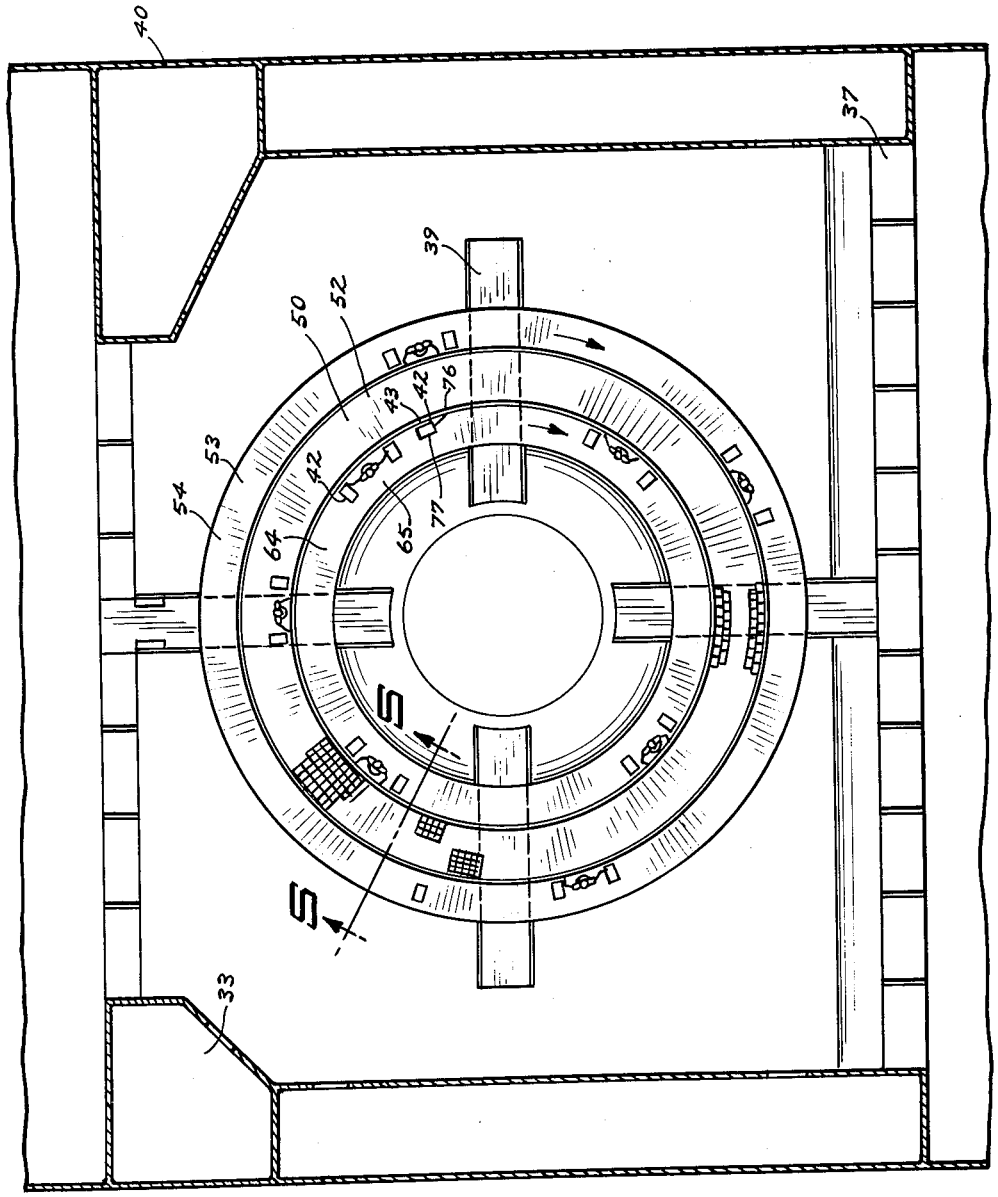
FIG. 4 is a top plan view of an order assembling warehouse showing a 1st modification of the present invention.

In FIGS. 4 and 5, parts thereof which are identical with parts shown in the first three figures are identically numbered.

In the first modification of the invention as shown in FIGS. 4 and 5, the order assembling apparatus includes a storage ring 50 which is constituted as a fixed platform 51 and a plurality of banks of vertically disposed horizontal shelves 52. A stock distribution ring 53 is constituted as a movable platform 54 having a plurality of rollers 55 rotatably mounted on the underside thereof and running in a pair of concentric circular track 56, 56. A rack 57 is concentric with said platform 54 and the tracks 56, 56 and is fixedly attached to the underside of said platform. A gear 58 is rotatably mounted in a bearing which is fixedly positioned with respect to the main warehouse floor 15 of the apparatus. Gear 58 is driven through means including other gears by the shaft 59 from a gear box 60 which in turn is powered from a drive motor 61. Operation of the control handle 62 on the control box 75 causes the shaft 59 to be selectively clutched to and unclutched from drive motor 18.

An order assembling ring 64 includes a rotating platform 65 which is supported on rollers 66 which are rotatably mounted on the underside of said platform and which run in tracks 67, 67. A rack 68 is concentric with the platform 65 and is fixedly mounted to the underside thereof. A gear 69 is rotatably mounted on a bearing which is fixedly positioned with respect to the main warehouse floor 15. Said gear 69 is driven through means including other gears by a shaft 70 from a gear box 71 which in turn is powered from a drive motor 72. Operation of control handle 73 on the control box 74 causes the shaft 70 to be selectively clutched to and unclutched from the drive motor 72.

It is to be noted that the horizontal shelves 52 situated on the fixed platform 51 are open at outer edges thereof to the area immediately above the stock distribution ring and are also open along the inner edges thereof to the area above the order assembling ring.

Operation

The operation of the device of the first modification is similar to the operation of the device of the first form thereof. Persons who perform the order assembling function take their positions on the rotating platform 65 of the order assembling ring 64 with an order basket 42 on a four wheeled dolly 43 at their side. As these persons move by the products in the horizontal shelves, they will remove the products listed on their order in the quantity indicated and will place them in the order basket. When the order is completely filled, and is entirely in one of the baskets, the order assembler will push the dolly 43 and its now loaded order basket 42 onto the inner portion of the warehouse floor 15. It can then be properly packaged if necessary or desired and can be transported from this inner area to the outside of the rings by use of one of the access passageways 39 or by use of a suitable overhead conveyor of any usual or preferred construction.

Should the order call for a large number of a particular one of the products to be taken from the storage ring and deposited on the order assembling ring, it may become necessary or desirable to temporarily halt the relative movement of the order basket 42, dolly 43 and the order filling person with respect to the fixed storage ring. For this purpose, a plurality of hooks 76 are provided around the periphery of the stock distribution ring 53 adjacent the order assembling ring 64. These hooks are used to fasten the dollies 43 thereto. This is best seen as at 77 in FIG. 4. Although the stock distribution ring is fixed, and all the hook 76 actually does is hold the dolly 46 in a stationary position, the dolly wheels will be rotated by the movable or rotating platform 65 of the order filling ring 64 as it revolves beneath it. The order assembling person can either walk at the rear of the dolly 43 to maintain his position while he is transferring the desired number of products from the shelf 52 of the storage ring 50, or can stand on a platform moving with the dolly to maintain his position in respect thereto.

The hooks 49, described in connection with the first form of the invention, serve the same purpose in regard to the rotatable platform 65 of the order assembling ring and the fixed platform 61 of the storage ring while products are being loaded from the first to the second.

For use in connection with retail trade, savings will be made in the use of this system over the expense of operating a grocery store or super market system. This is due to reduced handling costs, no outlay for display fixtures, no losses of goods because of spoilage due to rough customer handling, and because of the fact that such an order assembling warehouse need not be located in an area of high customer density and high property value, as well as other factors. These savings can be passed along to the customer in the form of free delivery service from the telephone order.

For use by wholesalers or distributors, the principal saving may be due to the speed of assembling orders. Under the present system of "streets and avenues" storage, commonly used today, vertically disposed horizontal shelves carrying the thousands of items which must be handled by a distributor provide a variable maze through which personnel storing, distributing and assembling of orders must move. Where many persons work in the same warehouse, the present storing and order filling means are confusing and productive of costly traffic problems. The efficient time saving method is necessary for today's distribution. The tedious and very strenuous work done by hand is too slow and costly in today's competition. This method is designed to handle the traffic problems of today in the least expensive operation, although the system may be almost completely mechanized and electrified, for example, by providing for electrical and/or mechanical selection of wares to be assembled and transportation of those wares to the order assembling ring.

In order to make effective use of space, the basic three ring elements of the present invenntion can be employed in connection with other concentric elements. For example, in the second modification as seen in FIG. 6, the stock distribution ring 53 could be loaded by means of an overhead conveyor 81 and a second storage ring 83 could be fixedly positioned immediately outside of and adjacent the stock distribution ring 53. A second movable order assembling ring 82 could be positioned outside of the second storage ring 83.

As previously explained, there is no reason why in the basic three elements of the invention, the order assembling ring 64 need be inside of rather than outside of the storage ring 50. In other words, the rings could be arranged to have a first stock distribution ring as the innermost ring, a storage ring as the next ring and an order assembling ring as the outer ring. With this arrangement, a second storage ring could be situated outside of the order assembling ring and orders could be assembled from either side of the order assembling ring separately or by drawing from both of the storage rings simultaneously. A second stock distribution ring would then be located outside of the second storage ring. A conveyor would then be used for taking the assembled orders off of the order assembling ring. This form of the inventiton is illustrated diagrammatically in FIG. 7. In this figure, the common order assembling ring is designated 64, the first storage ring as 50, and the first stock distribution ring as 53. The second storage ring 79 and the second stock distribution ring 80 form the outside rings of this unit while the conveyor for removing assembled orders is indicated at 78. This conveyor is above the platforms of each ring. In some instances, the conveyor will be above the shelves of the storage ring and in other cases it will be through an opening or break provided in these shelves.

What is claimed is:

1. A warehouse or store for receiving, storing and assembling for shipment large quantities of a large number of different wares including a main warehouse floor for receiving wares from locations outside said warehouse and for storing said wares until needed, a storage ring, an order assembling ring concentric and in adjacent spaced relation to said storage ring and a stock distribution ring concentric and in adjacent spaced relation to said storage ring at the side thereof opposite said order assembling ring, said storage ring comprising a ring-shaped horizontal platform having supported thereon a plurality of banks of vertically disposed horizontally extending shelves of size and shape and quantity to contain a predetermined number of each of said wares, each of said shelves being open to said order assembly ring and to said stock distribution ring to permit loading of said wares from a side of said storage ring adjacent said stock distribution ring and unloading all said wares upon said shelves from a side of said storage ring adjacent said order assembly ring, said stock distribution ring comprising a ring-shaped horizontal platform capable of supporting persons loading wares into said shelves, said order assembling ring comprising a ring shaped horizontal platform capable of supporting persons unloading wares from said shelves, the upper surface of said warehouse floor and the upper surface of each of said platforms lying substantially in the same horizontal plane and all the spaces between the upper surfaces of said warehouse floor and the upper surfaces of said platforms being substantially unobstructed so as to permit a wheeled vehicle to be freely moved from the warehouse floor onto said platforms or vice versa and from platform to platform while the platforms are moving or stationary as the case may be, and at least two of said rings being rotatably supported with respect to said floor, driving means operatively connected with said rotatably supported rings, and selective means for independently remotely regulating the rotational movement of said rotatable rings whereby one or more of said rings can remain stationary without interfering with the rotation of another ring.

2. The combination as defined in claim 1, wherein said storage ring is fixed and said order assembling ring and said stock distribution ring are supported for rotary movement.

3. The combination as defined in claim 1, including an overhead conveyor having an end portion thereof disposed adjacent to and above a portion of one of said rings to assist in loading and unloading wares with respect to said one ring.

References Cited in the file of this patent

UNITED STATES PATENTS

| | | |
|---|---|---|
| 1,475,149 | Smith | Nov. 20, 1923 |
| 2,033,695 | Emerson | Mar. 10, 1936 |
| 2,138,285 | Spiegel | Nov. 29, 1938 |
| 2,315,013 | Pecker | Mar. 30, 1943 |
| 2,776,522 | Schramm | Jan. 8, 1957 |

FOREIGN PATENTS

| | | |
|---|---|---|
| 318,783 | Great Britain | Sept. 12, 1929 |
| 728,372 | Great Britain | Apr. 20, 1955 |